United States Patent [19]
Ho

[11] Patent Number: 5,875,661
[45] Date of Patent: Mar. 2, 1999

[54] ANTI-THEFT LOCK ASSEMBLY FOR STEERING WHEELS

[76] Inventor: Tien-Chin Ho, 19, Sub-lane 24, Lane 8, Der-Yang 2 Street, Ho-Bi Village, Zen-Der Hsiang, Tainan Hsien, Taiwan

[21] Appl. No.: 148,994

[22] Filed: Sep. 8, 1998

[51] Int. Cl.⁶ .................................................. B60R 25/02
[52] U.S. Cl. ................................ 70/209; 70/226; 70/238
[58] Field of Search ............................. 70/209–212, 225, 70/226, 237, 238

[56] References Cited

U.S. PATENT DOCUMENTS

| | | | |
|---|---|---|---|
| 5,454,240 | 10/1995 | Whitney | 70/209 |
| 5,537,847 | 7/1996 | Dalton et al. | 70/209 |
| 5,540,067 | 7/1996 | Kim | 70/209 |
| 5,619,873 | 4/1997 | Wood | 70/209 |
| 5,676,001 | 10/1997 | Ho | 70/209 |
| 5,755,123 | 5/1998 | Winner, Jr. | 70/209 |
| 5,782,116 | 7/1998 | Ryan et al. | 70/209 |

FOREIGN PATENT DOCUMENTS

| | | | |
|---|---|---|---|
| 2263455 | 7/1993 | United Kingdom | 70/209 |

*Primary Examiner*—Suzanne Dino Barrett
*Attorney, Agent, or Firm*—Larson & Taylor

[57] ABSTRACT

A lock assembly a casing securely, releasably engaged onto a steering wheel of a vehicle. The casing includes a number of slots defined in a first portion thereof and a plurality of first holes defined a second portion thereof. A movable plate is mounted between the casing and the steering wheel and slidable relative to the casing. The movable plate includes a number of second holes defined therein for optionally aligning with the first holes in the casing. A locking device consisting of two hooked rods are provided to lock the casing and the movable plate in position.

6 Claims, 3 Drawing Sheets

5,875,661

ANTI-THEFT LOCK ASSEMBLY FOR STEERING WHEELS

BACKGROUND OF THE INVENTION

1. Field of the Invention

The present invention relates to an anti-theft lock assembly to be mounted to the steering wheel of a vehicle.

2. Description of the Related Art

U.S. Pat. No. 5,676,001 issued on Oct. 14, 1997 discloses an anti-theft device engaged onto the steering wheel of a vehicle. U.S. patent application Ser. No. 08/937,794 filed on Sep. 25, 1997 discloses an improved design over the anti-theft device described in U.S. Pat. No. 5,676,001. The present invention is intended to provide a different design in this regard, which allows easy operation of the user for locking the steering wheel.

SUMMARY OF THE INVENTION

A lock assembly in accordance with the present invention comprises a casing securely, releasably engaged onto a steering wheel of a vehicle. The casing includes a plurality of slots defined in a first portion thereof and a plurality of first holes defined a second portion thereof. A movable plate is mounted between the casing and the steering wheel and slidable relative to the casing. The movable plate includes a plurality of second holes defined therein for optionally aligning with the first holes in the casing.

A first rod has a first hook releasably extended through one of the slots in the casing and engaged with a rim of the steering wheel. A second rod has a second hook releasably extended through a pair of aligned first hole and second hole and engaged with the rim of the steering wheel. The first rod and the second rod are engaged together and movable relative to each other. Further, means is provided for retaining one of the first rod and the second rod in position relative to the other of the first rod and the second rod.

The slots of the casing are elongated, and the first holes and the second holes are round. In a preferred embodiment of the invention, the casing includes two third holes defined in the second portion thereof, and the movable plate includes two second slots defined therein. Two pins are respectively extended through the third holes and the second slots to allow sliding movement of the movable plate relative to the casing.

The movable plate may include an arcuate end section for releasably engaging with the rim of the steering wheel.

One of the first rod and the second rod includes a longitudinal hole defined therein for slidingly receiving a portion of the other of the first rod and the second rod. The other of the first rod and the second rod includes a plurality of recesses defined therein, and said one of the first rod and the second rod includes a lock core with a latch member for releasably engaging one of the recesses.

Other objects, advantages, and novel features of the invention will become more apparent from the following detailed description when taken in conjunction with the accompanying drawings.

DESCRIPTION OF THE PREFERRED EMBODIMENTS

Figure 1:
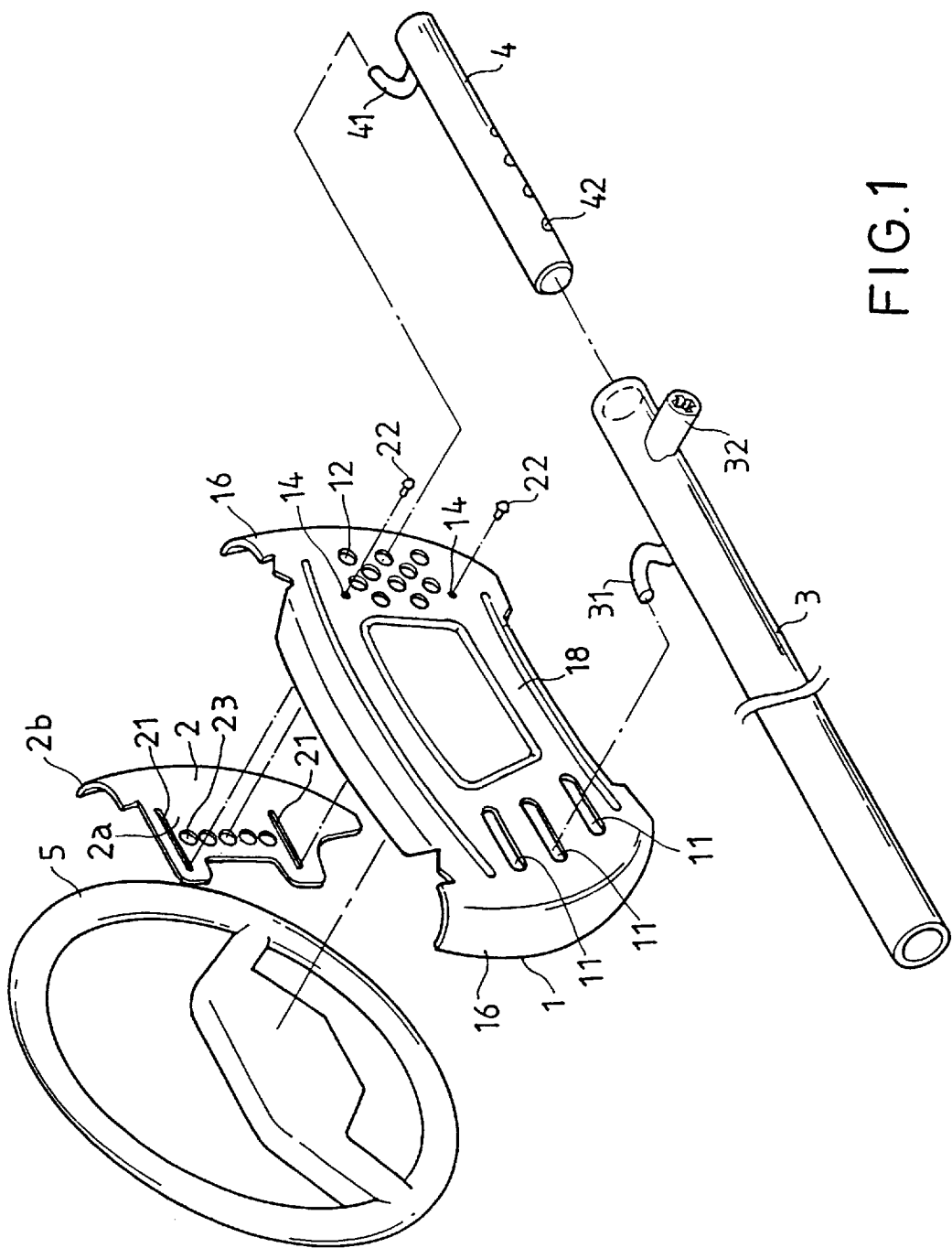
FIG. 1 is an exploded perspective view of an anti-theft lock assembly in accordance with the present invention and a steering wheel to which the lock assembly is mounted.

Referring to the drawings and initially to FIG. 1, an anti-theft lock assembly in accordance with the present invention is to be removably engaged onto to a steering wheel 5 and generally includes a casing 1, a movable plate 2, and a locking means consisting of a first rod 3 and a second rod 4, which will be described later.

The casing 1, made of rigid material, is engaged onto the steering wheel 5 which may have air bag (not shown) received in a middle portion thereof such that the air bag can be protected by the casing 1 as the casing 1 covers a considerable area of the steering wheel 5. The casing 1 includes an arcuate outer section 16 for securely engaging with a portion of the steering wheel 5. On a front face 18 of the casing 1, a number of slots 11 (preferably elongated) are defined in, e.g., a left portion of the front face 18 and extend along a longitudinal direction of the casing 1 and spaced along a vertical direction of the casing 1, while a number of holes (round or the like) 12 are defined in, e.g., a right portion of the front face 18 of the casing 1. Two smaller holes 14, preferably vertically spaced, are defined in the front face 18 of the casing 1 and adjacent to the holes 12.

The movable plate 2, preferably made of a material the same as that of the casing 1, includes a board 2a with an arcuate side section 2b for securely engaging with a portion of the steering wheel 5. The board 2a includes two horizontal slots 21 defined therein and a number of holes 23 vertically spaced between the horizontal slots 21. The first rod 3 of the locking means includes a first hook 31 formed thereon and a lock core 32 mounted therein, while the second rod 4 is slidably, partially received in a longitudinal hole (not labeled) defined in the first rod 3 and includes a second hook 41 thereon. The user may use a key to operate the lock core 32 to cause a latch member (not shown) of the lock core 32 to releasably engage with one of a number of recesses 42 defined in the second rod 4, which is conventional and therefore not further described.

Figure 2:
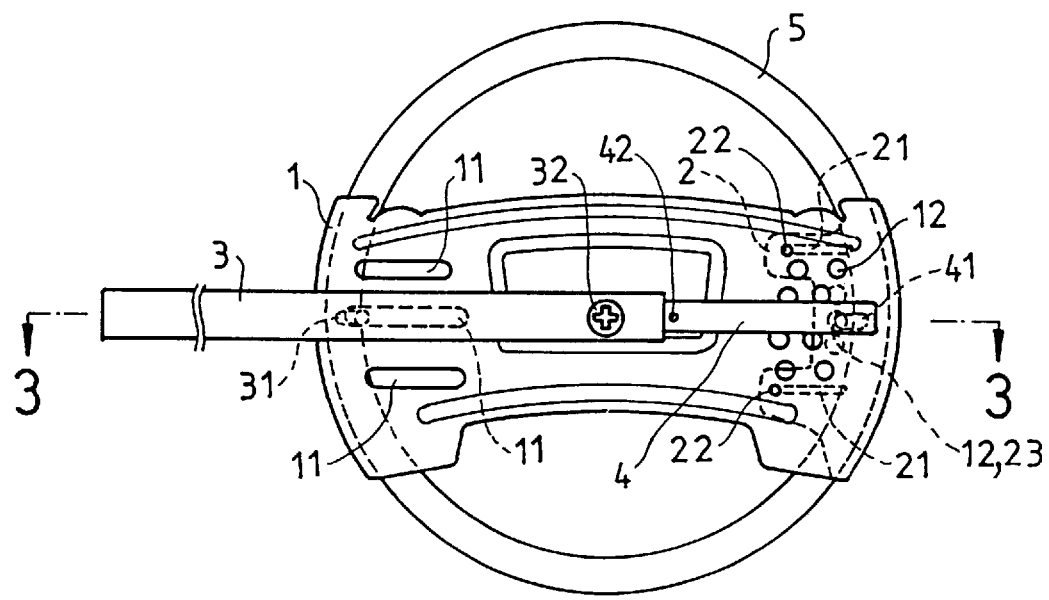
FIG. 2 is a schematic plan view of the steering wheel and the anti-theft lock assembly.
Figure 3:
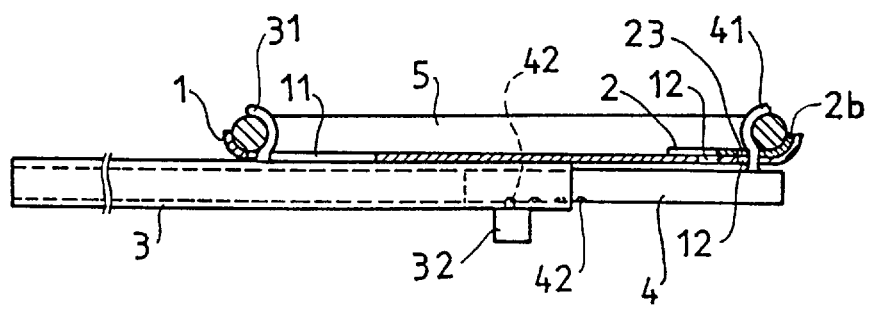
FIG. 3 is a sectional view taken along line 3—3 in FIG. 2.

Two pins 22 are respectively extended through the holes 14 on the casing 1 and the horizontal slots 21 of the movable plate 2 to allow sliding movement of the movable plate 2 relative to the casing 1. In use, when mounted onto a larger steering wheel 5, as shown in FIGS. 2 and 3, the arcuate side section 2b of the movable plate 2 contacts with a portion (e.g., the right portion) of the arcuate outer portion of the casing 1. The casing 1 together with the movable plate 2 are mounted to the steering wheel 5 such that the arcuate side section 2b is securely engaged with a right side portion of the steering wheel 5, while the left portion of the arcuate outer portion 16 of the casing 1 is securely engaged with a left side portion of the steering wheel 5. At this time, some of the holes 23 on the movable plate 2 are aligned with some of the holes 12 in the casing 1. Next, the second rod 4 is mounted to the steering wheel 5 in which the second hook 41 is extended through a pair of aligned holes 23 and 12 and engaged with a rim of the steering wheel 5. The first rod 3 is then applied, wherein the longitudinal hole in the first rod 3 receives a portion of the second rod 4. The first rod 3, having the hook 31 received in one of the slots 11 (the most appropriate one) is slid away from the second rod 4 to a position where the first hook 31 is engaged with the rim of the steering wheel 5. At this position, the user may use a key to operate the lock core 32 to cause the latch member of the lock core to engage with one of the recesses 42 of the second rod 4. As a result, relative movement between the first rod 3 and the second rod 4 is prohibited such that removal of the casing 1 and/or the movable plate 2 is not allowed.

Figure 4:
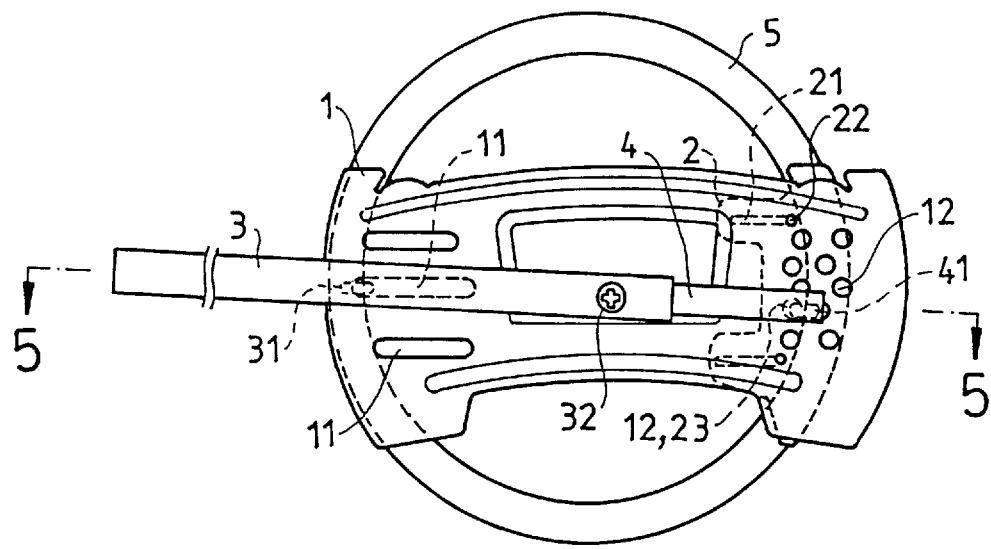
FIG. 4 a view similar to FIG. 2, wherein the steering wheel is of a smaller size.
Figure 5:
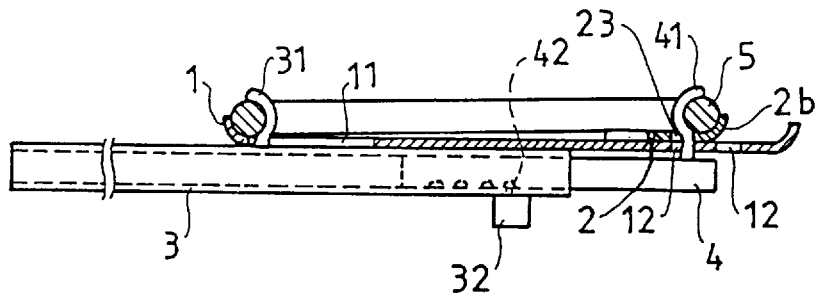
FIG. 5 is a sectional view taken along line 5—5 in FIG. 4.

When mounted onto a smaller steering wheel 5, as shown in FIGS. 4 and 5, the arcuate side section 2b of the movable plate 2 is moved inwardly and thus does not contact with the right portion of the arcuate outer portion 16 of the casing 1. The casing 1 together with the movable plate 2 are mounted to the steering wheel 5 such that the arcuate side section 2b is securely engaged with the right side portion of the steering wheel 5, while the left portion of the arcuate outer portion 16 of the casing 1 is securely engaged with the left side portion of the steering wheel 5. At this time, some of the holes 23 on the movable plate 2 are aligned with some of the holes 12 in the casing 1. Operation of the first and second rods 3 and 4 and subsequent locking procedure are identical to those disclosed in the above paragraph. Accordingly, the locking assembly of the present invention can be easily, quickly engaged onto the steering wheel and can be applied to steering wheels of different sizes.

Figure 6:
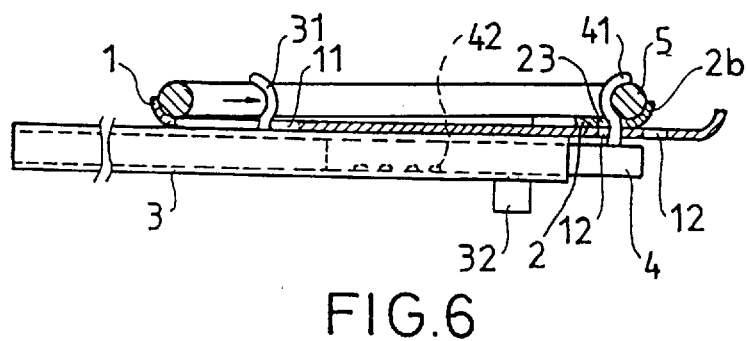
FIG. 6 a sectional view similar to FIG. 5, illustrating unlocking operation of the lock assembly.

Unlocking operation of the lock assembly is illustrated in FIG. 6, wherein after disengaging the latch member of the lock core 32 from the recess 42 of the second rod 4 by the key, the first rod 3 is allowed to move toward the second rod 4 for removal, which is conventional and therefore not further described.

Although the invention has been explained in relation to its preferred embodiment, it is to be understood that many other possible modifications and variations can be made without departing from the spirit and scope of the invention as hereinafter claimed.

What is claimed is:

1. A lock assembly, comprising:

a casing adapted to be securely, releasably engaged onto a steering wheel of a vehicle, the casing including a plurality of slots defined in a first portion thereof and a plurality of first holes defined in a second portion thereof, a movable plate mounted between the casing and the steering wheel and slidable relative to the casing, the movable plate including a plurality of second holes defined therein for optionally aligning with the first holes in the casing, a first rod having a first hook releasably extended through one of the slots in the casing and adapted to be engaged with a rim of the steering wheel, and a second rod having a second hook releasably extended through a pair of aligned said first hole and said second hole and adapted to be engaged with the rim of the steering wheel, the first rod and the second rod being engaged together and movable relative to each other, and comprising means for retaining one of the first rod and the second rod in position relative to the other of the first rod and the second rod.

2. The lock assembly according to claim 1, wherein the slots of the casing are elongated, and the first holes and the second holes are round.

3. The lock assembly according to claim 1, wherein the casing includes two third holes defined in the second portion thereof, the movable plate includes two second slots defined therein, and further comprises two pins respectively extended through the third holes and the second slots to allow sliding movement of the movable plate relative to the casing.

4. The lock assembly according to claim 1, wherein the movable plate includes an arcuate end section for releasably engaging with the rim of the steering wheel.

5. The lock assembly according to claim 1, wherein one of the first rod and the second rod includes a longitudinal hole defined therein for slidingly receiving a portion of the other of the first rod and the second rod.

6. The lock assembly according to claim 1, wherein the other of the first rod and the second rod includes a plurality of recesses defined therein, and said one of the first rod and the second rod includes a lock core with a latch member for releasably engaging one of the recesses.

* * * * *